United States Patent
Westerman

(10) Patent No.: US 6,754,397 B1
(45) Date of Patent: Jun. 22, 2004

(54) METHOD, SOFTWARE AND DEVICES FOR DESIGNING A SCALABLE IMAGE (FIR) FILTER WITH INTEGER COEFFICIENTS

(75) Inventor: Larry Alan Westerman, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/522,403

(22) Filed: Mar. 9, 2000

(51) Int. Cl.[7] .............................. G06K 9/40; G06K 9/32
(52) U.S. Cl. ....................... 382/260; 382/298; 382/300
(58) Field of Search ........................ 382/260, 261–264, 382/270, 284, 298, 300; 708/300, 301, 322; 348/580

(56) References Cited

U.S. PATENT DOCUMENTS

| | | | |
|---|---|---|---|
| 3,976,982 A | 8/1976 | Eiselen | 382/284 |
| 4,136,398 A | 1/1979 | Eggermont | 708/301 |
| 4,494,214 A | 1/1985 | Bernard et al. | 708/322 |
| 4,602,285 A | 7/1986 | Beaulier et al. | 348/580 |
| 5,051,942 A | 9/1991 | Matsumoto et al. | 708/300 |
| 5,138,672 A | 8/1992 | Hirabayashi et al. | 382/264 |
| 5,335,295 A | 8/1994 | Ferracini et al. | 382/298 |
| 5,394,483 A | 2/1995 | Daly | 382/270 |
| 5,574,572 A | 11/1996 | Malinowski et al. | 382/298 |
| 5,694,148 A | 12/1997 | Cahill, III | 382/298 |
| 5,694,491 A | 12/1997 | Brill et al. | 382/260 |
| 5,790,714 A | 8/1998 | McNeil et al. | 382/300 |
| 5,847,714 A | 12/1998 | Naqvi et al. | 382/298 |

OTHER PUBLICATIONS

Title: H.263 Anchors—Technical Description, Authors: Gisle Bjontegaard and Karl Olav Lillevoid, Organization: Telenor R&D, Group: MPEG–4, Subgroup: Video, 4 pages.

Primary Examiner—Jose L. Couso
Assistant Examiner—Duy M. Dang
(74) Attorney, Agent, or Firm—Marger Johnson & McCollom

(57) ABSTRACT

Methods, software and devices are provided for designing scalable image FIR filters with integer coefficients. A template FIR filter is designed for the desired scaling operation. Then an ideal filter is designed from the template filter, and a suitable sample image is filtered, to produce a reference image. A scalable skeleton filter is designed, having integer coefficients and approximating the template FIR filter. A finite domain of integers is defined around each integer coefficient. This determines a finite universe of possible combinations of coefficients, and thus also respective available test filters. The available test filters are first screened for meeting an integer normalization requirement. Those that do not meet it within a tolerance are rejected. Then the screened test filters are ranked according to performance in terms of filter parameters. The sample image is filtered by each of the best ranked test filters, to produce test images. The test images are evaluated against the reference image by running a model for predicting visually perceptible differences. The test image that produces the fewest differences also determines which filter is chosen.

19 Claims, 5 Drawing Sheets

| Input pixel values | A | B | C | D | E | F | ... |
| Upsampled | A 0 0 | B 0 0 | C 0 0 | D 0 0 | E 0 0 | F | ... |
| Filtered | a a' a" | b b' b" | c c' c" | d d' d" | e e' e" | f | .. |
| Output pixel values | a | b" | | d' | | f | .. |

FIG. 1 (PRIOR ART)

| FILTER | EXEMPLARY PRIOR ART | PRESENT INVENTION |
|---|---|---|
| # OF TAPS | 21 | 18 |
| MEAN ABSOLUTE PROBABILITY OF DETECTION | 8.5 | 6.1 |
| STANDARD DEVIATION OF PROBABILITY OF DETECTION | 11.3 | 8.8 |
| % PIXELS AT OR ABOVE 10% ABSOLUTE PROBABILITY OF DETECTION | 23.4 | 16.9 |
| % PIXELS AT OR ABOVE 50% ABSOLUTE PROBABILITY OF DETECTION | 1.5 | 0.6 |

METHOD, SOFTWARE AND DEVICES FOR DESIGNING A SCALABLE IMAGE (FIR) FILTER WITH INTEGER COEFFICIENTS

BACKGROUND OF THE INVENTION

1. Field of the Invention

The present invention is related to the field of designing filters for filtering image data, and more specifically to methods, software and devices for designing a scalable image filter with integer coefficients for image scaling operations.

2. Description of the Related Art

Video display applications receive image data to produce an image. Often the source size and format of the image data does not match the display size and format. For such applications, images must be resized.

A number of digital processing techniques exist for resizing images, using their image data. Resizing is specified in terms of a scaling ratio M:N. One common method is now described.

Referring to FIG. 1, a method for resizing images in one dimension is described, called multirate resampling. In the first row there are shown input pixel values A, B, C, . . . . It is desired to perform M:N (5:3) multirate resampling.

The input pixel values are upsampled. This is accomplished by inserting N−1 (i.e. 2) zeros between each pair of them. The upsampled pixels are then filtered using an intermediate filter. The intermediate filter has a nominal cutoff frequency $\omega_S$ given by Equation (1).

$$\omega_S = \min[\pi/M, \pi/N] \qquad \text{Equation (1)}$$

This generates the filtered samples a, a', a", b, b', b", . . . . These are also called the upsampled pixels.

Afterwards, every M-th (i.e. every 5th) pixel of the filtered upsampled pixels is output for the final values. It should be noted that, for every five (M) input pixel values, there are three (N) output pixel values.

While this is the general process, further efficiencies are gained as follows. If the intermediate filter is a Finite Impulse Response (FIR) filter, i.e. a causal filter, then filtering needs to be performed only at the output pixel locations. A causal FIR filter is one for which $$p_{out}(i) = \sum_j coeff(j) p_{in}(j) \qquad \text{Equation (2)}$$

the output $p_{out}(i)$ is a linear combination of the input values, according to Equation (2).

The summation for the coefficients $coeff(j)$ runs, for a K-tap filter, from $coeff(-K/2)$ to $coeff(+K/2)$.

A further efficiency is that, since the upsampled pixel values contain many zero values, only a fraction of the computations need be performed.

A number of techniques exist for designing FIR filters, to capitalize on the above-described efficiencies. These design methods, however result in filters with real, rather than integer coefficients.

BRIEF SUMMARY OF THE INVENTION

The present invention overcomes these problems and limitations of the prior art.

Generally, the present invention provides methods and software for designing scalable image FIR filters with integer coefficients. In addition, it provides devices that perform the method, such as by running the software. Such devices include purpose-built VLSI circuits, general-purpose digital signal processing chips, and general-purpose computers.

In the method of the invention, a template FIR filter is designed for the desired scaling operation. Then an ideal filter is designed from the template filter.

Then a scalable skeleton filter is designed, having integer coefficients and approximating the template FIR filter. A finite domain of integers is then defined around each integer coefficient. This determines a finite universe of possible combinations of coefficients, and thus also respective available test filters.

The available test filters are first screened for meeting an integer normalization requirement. Those that do not meet it within a preset tolerance are rejected. Then, the remaining available test filters are preferably ranked according to performance in terms of filter parameters.

Then the best ranked test filters are evaluated against the ideal filter. Evaluation against the ideal filter is performed by comparing images. A sample image is filtered by the ideal filter to provide a reference image, and also by the screened test filters to provide the test images. The test images are evaluated preferably by a predictive model. The one that is predicted to produce the fewest differences also determines which filter is chosen, from those available in the finite universe.

A filter designed by the invention is superior to those in prior art. Indeed, by designing filters having integer coefficients, a division for normalization is performed only by shifting, which expedites the process. Additionally, as will be appreciated from the description below, the performance is higher. A filter designed according to the present invention produces artifact free images from arbitrary input.

The present invention can be used to design filters for resizing images in various applications. For example, images in HDTV high resolution can be resized for showing on an NTSC display, and images in SVGA can be resized for showing on a VGA projector.

The invention will become more readily apparent from the following Detailed Description, which proceeds with reference to the drawings, in which:

BRIEF DESCRIPTION OF THE DRAWINGS

FIG. 1 is a schematic for demonstrating a multirate signal processing example of the scaling operation that uses 5:3 resampling.

FIG. 3 is a table comparing the performances of an exemplary filter in the prior art, and a filter designed according to the present invention.

DETAILED DESCRIPTION OF THE PREFERRED EMBODIMENT(S)

As has been mentioned, the present invention provides methods, softwares, and devices for designing filters. As will be appreciated by a person skilled in the art, their descriptions are interrelated, and should be taken together.

Figure 2A:
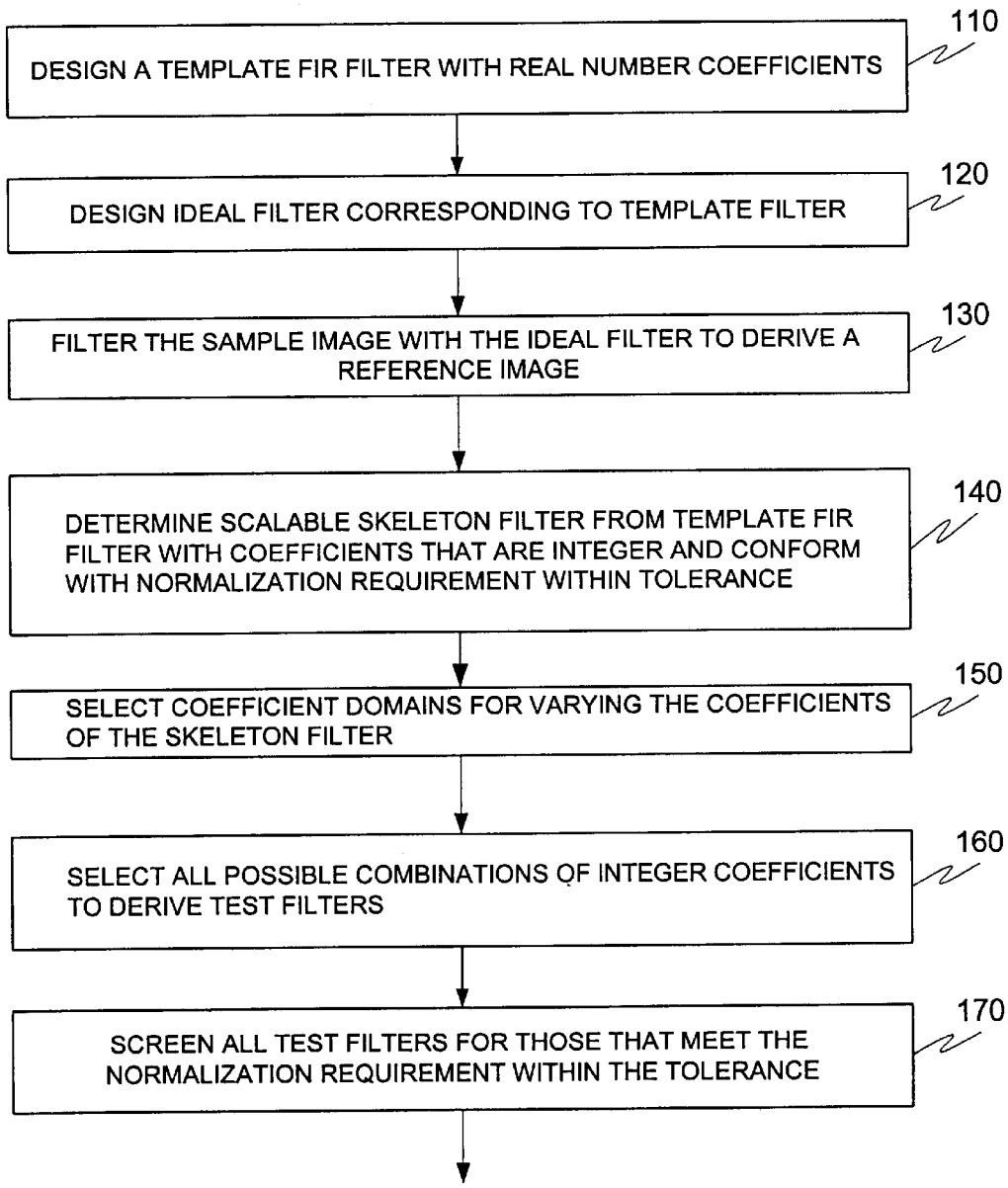
FIGS. 2A and 2B, taken together, are a flowchart for illustrating a method according to the invention.
Figure 2B:
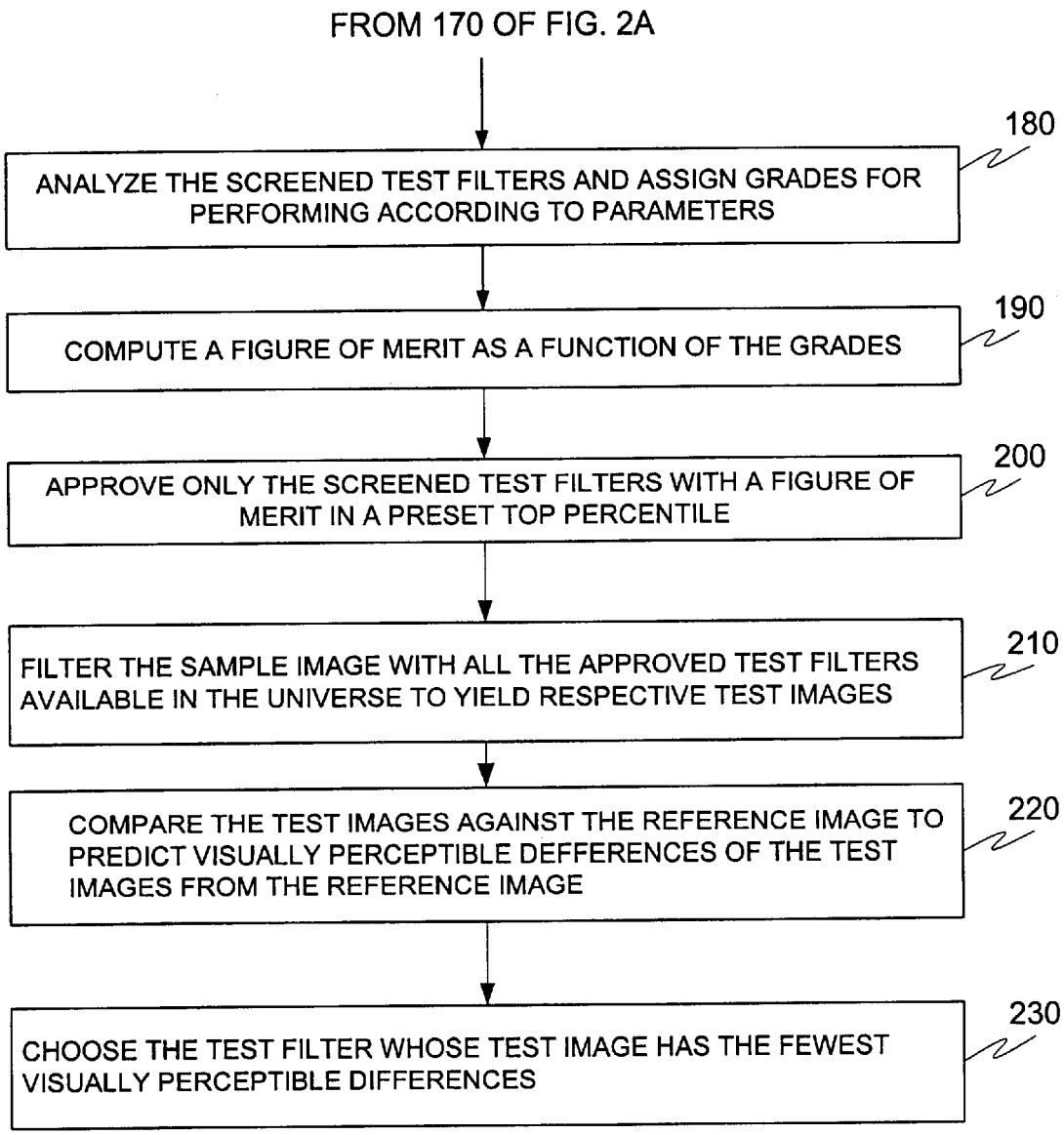

Referring now to FIGS. 2A and 2B, a method according to the invention is described, using flowchart 100. The method is for designing a filter for scaling an image according to the predetermined scaling ratio.

According to box 110, a template Finite Impulse Response (FIR) filter is designed for the predetermined scaling ratio. This is performed using any standard filter design methodology, with preset low pass cutoff frequency and desired stopband attenuation. The resulting template filter has template coefficients $r_j$ that are real numbers. A typical such template filter might have 21 taps.

According to box 120, an ideal filter is designed from the FIR template filter. The ideal filter is designed with the same methodology as the template filter. In addition, the ideal filter is designed with the desired low pass cutoff frequency, pass band ripple, cutoff slope, and stopband attenuation. Moreover, the ideal filter has the same phase characteristics as the template filter (that is, both filters have odd or even numbers of coefficients). It should be noted that a typical such ideal filter might have 130 taps.

According to box 130, a suitable sample image is filtered with the ideal filter, to derive a reference image. The reference image will be used as a reference for comparing test filters, as will become evident from the below. Preferably filtering also results in rescaling an image dimension of the reference image with respect to the sample image, although that is not necessary.

According to box 140, a skeleton filter is determined from the template filter. The skeleton filter has coefficients $c'_j$ that are derivable from the template coefficients. In addition, the skeleton filter is scalable, and has integer coefficients at some scaling. This means that they conform to a preset normalization requirement, at least within a first preset tolerance. These two conditions are met by searching for a scalar a that meets both Equations (3) and (4):

$$|\alpha r_j - c'_j| \leq 0.5 \qquad \text{Equation (3)}$$

$$\sum_{j=0}^{K} c'_{j-(K/2)} \approx N * 2^R \qquad \text{Equation (4)}$$

wherein $r_j$ are the real number coefficients of the template filter, $c'_j$ are the integer coefficients of the K-tap skeleton filter, R is a convenient integer number. N is the denominator of the scaling ratio (in the example of FIG. 1, N=3). If Equation (4) is not met exactly, it should be within a first preset tolerance. A tolerance requirement can be expressed as a ratio, and its value as a percentage.

The search can be performed by having a value of α sweep a large range. Ultimately, the value of α does not matter, as it drops out after yielding the skeleton filter.

Equation (4) is also known as a normalization requirement. Practically, it will not be met exactly. It is preferred to set in advance a tolerance for meeting Equation (4). If the tolerance is defined in terms of a percentage, Equation (4) will be recast as a fraction, etc.

According to box 150, at least one coefficient domain is selected, for varying at least one of the integer coefficients of the skeleton filter. The coefficient domain has a finite plurality of integer values. Selecting the coefficient domain derives a finite universe of available integer coefficient sets $c''_j$ around the skeleton integer filter.

Optionally and preferably, the coefficient domain is centered around the integer coefficient. Moreover, a coefficient domain is selected for each of the integer coefficients respectively. Optionally and preferably, each coefficient domain is centered around its respective integer coefficient, and all the domains include a similar number 2W+1 of integer numbers, where W is an integer.

A domain can be defined to be all coefficients $c''_j$ that follow Equation (5) below:

$$|c''_j - c'_j| \leq W \qquad \text{Equation (5)}$$

A suitable number for W ranges typically from 2 to 8. A smaller W will result in a shorter search time, while a larger W can result in a better test filter.

According to box 160, all integer coefficient sets available in the universe are selected. This derives a plurality of corresponding available test filters, one test filter for each coefficient set. The integer coefficient sets are formed as combinations of the integer coefficients. All possible combinations are selected to derive the plurality of corresponding available test filters.

According to box 170, all the test filters are screened for meeting the normalization requirement of equation (4). This is accomplished by inquiring whether an available set of integer coefficients meets the integer normalization requirement. Meeting the requirement can be within a preset second tolerance. The second tolerance can equal the first tolerance. If it does not, the set is removed from the available sets in the universe. Preferably this is performed prior to the eventual filtering the sample image with an associated test filter, which is described below. This reduces the overall amount of processing.

According to boxes 180, 190, and 200, only the available test filters that perform well in terms of preset filter performance parameters are approved for further processing.

More specifically, according to box 180, the screened test filters are analyzed by Fourier techniques. The filters are then evaluated for filter performance parameters such as pass band ripple, attenuation at the nominal stopband frequency, and minimum attenuation above the stopband frequency. Then grades are assigned to each of the screened test filters, one grade for its performance in each of the parameters. The grades can be in the form of a percentage.

Then, according to box 190, a figure of merit is computed as a function of the grades. This helps rank the test filters according to single criterion. The figure of merit can be designed in terms of which of the filter performance parameters is more important.

Next, according to box 200, only some of the screened test filters are approved for further processing. Preferably, the ones that are approved are those with a figure of merit in a preset top percentile. The rest of the test filters are rejected.

According to box 210, the sample image is filtered with each of all the available test filters. Each filtering yields a respective test image. Filtering preferably results in rescaling an image dimension, although that is not necessary. If that is the case, then the test images are rescaled with respect to the sample image. It is understood that the test images, as well as the reference image generated at box 130, are really collections of data. They need not necessarily be displayed for evaluation.

According to box 220, the test images are compared against the reference image. Comparison is for predicting visually perceptible differences of the test images from the reference image. This is generally accomplished by using a predictive model of the human visual system. A number of such models exist. One model is described in U.S. Pat. No. 5,394,483 to Daly, teaching a model based upon psychophysical measurements. In such models, two images are input, one reference and one test. When reviewing distance is also input, the model produces a gray scale image where the value at each point is the percentage probability that a viewer will detect a difference.

The model is preferably coded as a computer program, and the differences in visually perceptible differences are preferably quantified as metrics, that are thus computed. The metrics refer to probability of detection of a difference, for pixels. Any set of metrics may be chosen according to the invention.

The preferred set of metrics includes:

(a) a mean absolute probability of detection for all pixels, (b) standard deviation of the absolute probability of detection of all pixels, (c) percent of pixels at or above the 50% absolute probability of detection level, and (d) percent of pixels at or above the 10% absolute probability of detection level.

According to box 230, the test filter is chosen whose test image has at the fewest visually perceptible differences. In practice, the test filters are ranked according to how well their metrics meet preset visual difference evaluation criteria, and then the top ranked test filter is chosen.

The invention results in designing filters with superior performance. An example is discussed referring to FIG. 3. An exemplary filter in the prior art is described in a standard document number MPEG95/0322, November 1995, Dallas, titled H.263 Anchors—Technical Description. The exemplary filter is for ⅗ scaling, and uses 21 taps. The exemplary prior art filter might be box 310 of FIG. 4, designed as per the box 110 of FIG. 2A.

The exemplary prior art filter is compared to a filter designed to according to the present invention, evaluated using a 512×512 "Lena" image rescaled to 306×306. A filter designed according to the present invention might be Test Filter 2, i.e. box 402 of FIG. 4.

As can be seen from the table of FIG. 3, the filter of the present invention outperforms the exemplary prior art filter in every one of the four filter performance categories. In addition, it achieves that higher performance using fewer taps, which saves in further processing downstream.

Referring briefly to FIG. 2A, it is recalled that the integer normalization requirement was not required to be met exactly, but only within a preset tolerance. It might be thought that, allowing a nonzero tolerance would result in a filter that would have integer coefficients, but perhaps miss on some accuracy. The results tabulated in FIG. 3 prove that it did not hurt to have allowed the tolerance to be nonzero. Any accuracy that may have been lost due to the nonzero tolerance was eclipsed by overall better results.

It will be appreciated that, while the techniques described in this document are for filtering in only one dimension, that is done only for the sake of convenience. While images are two-dimensional, present literature addresses only one dimension, and that is done for simplicity. A person skilled in the art will be able to apply, in view of the present description, the method and software of the present invention in one or two dimensions.

The invention also provides a program that performs a method of the invention. The program is most advantageously implemented as a computer program.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art. Often, for the sake of convenience only, it is preferred to implement and describe a program as various interconnected distinct software modules or features, also known individually as softwares. This is not necessary, however, and there may be cases where various softwares are equivalently aggregated into a single program with unclear boundaries.

In implementing these algorithms, it should be remembered what the data stand for. While the present description refers to pixels, that is understood to be a generic term for samples containing values, which, taken together, represent an image.

In any event, the software modules or features of the present invention can be implemented by themselves, or in combination with others. Again, the combination can result in distinct software modules, or ones with blurred boundaries.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. When stored, they can be stored in any computer-readable medium. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

As will be appreciated by a person skilled in the art, the software of the invention handles groups of data. The groups may be either outright implemented in files, or just implied from the processing.

Figure 4:
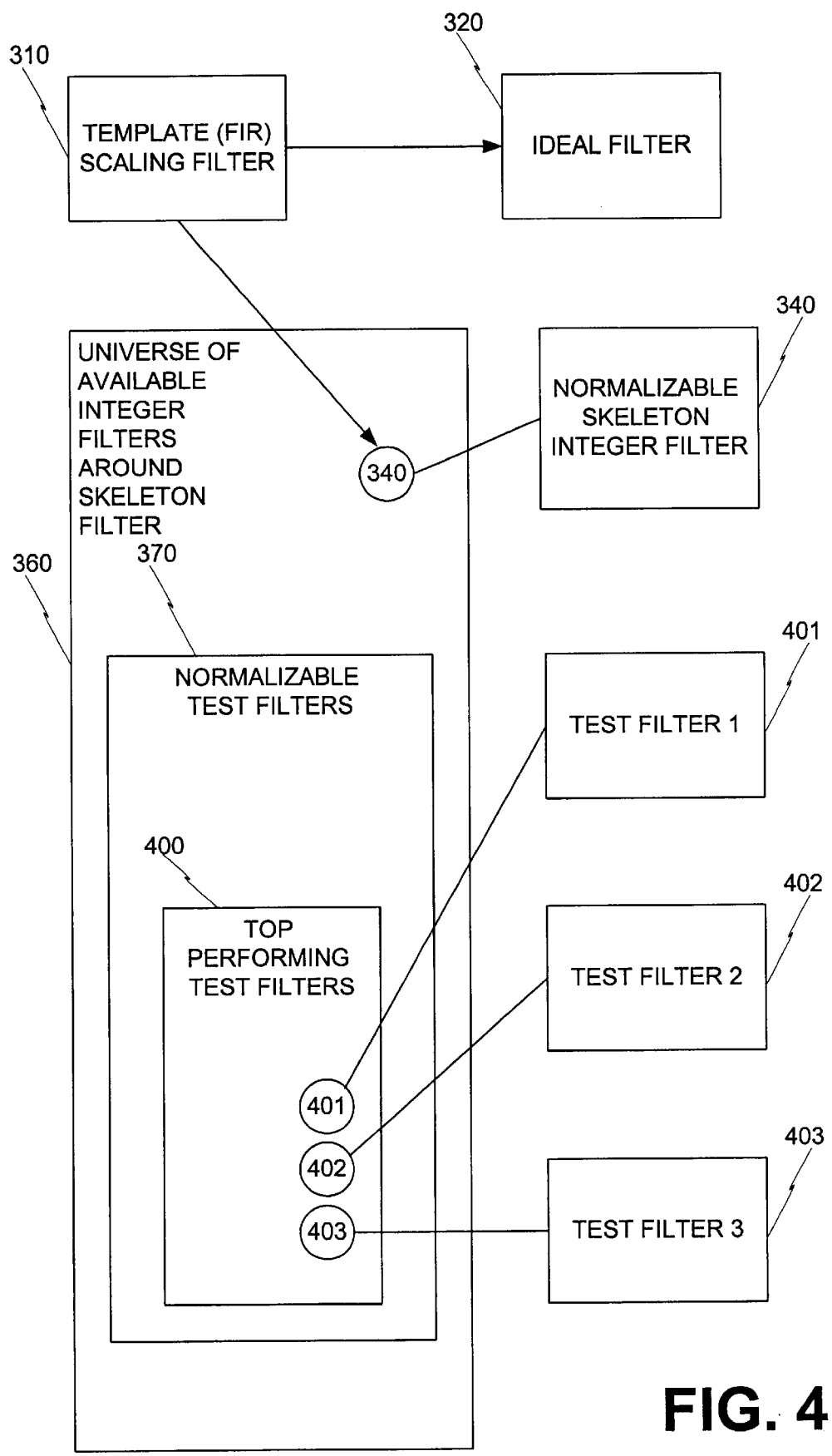
FIG. 4 is a diagram showing groupings of data for implementing an ideal filter and test filters according to a method and/or software of the invention.
Figure 5:
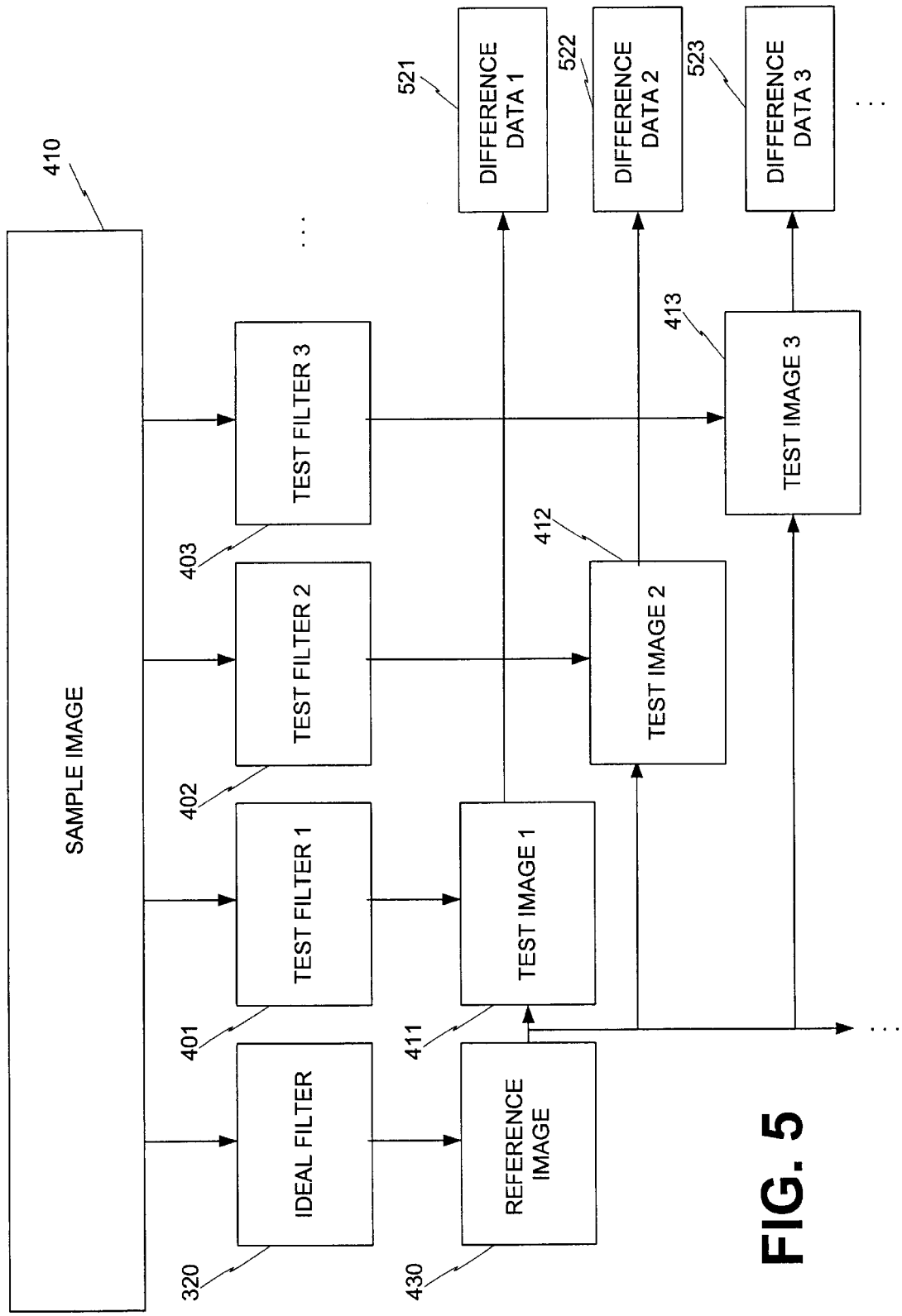
FIG. 5 is a diagram of groups of data for comparing the test filters of FIG. 4 to the ideal filter of FIG. 4 according to a method and/or software of the invention.

Referring now to FIGS. 4 and 5, groups of data are described to better elucidate their interrelationships. FIG. 4 illustrates the relationships of groups of data for generating the ideal filter and the test filters.

Box 310 is for the data for the template filter designed according to box 110. The data is filter coefficients. Box 320 includes the coefficients of the ideal filter made according to box 120. Box 340 includes the coefficients of the skeleton filter made according to box 140.

Box 360 is the universe of available test filters, defined by the universe of all possible combinations of integer coefficient sets. Box 370 is a subset of box 360, and is the universe of available test filters that have also been screened for meeting the normalization requirement. Box 380 is a subset of box 360, and is the universe of available test filters that have also been approved for performing well as filters. Box 380 includes a plurality of test filters. Only three such test filters are shown, namely Test Filter 1 (401), Test Filter 2 (402), and Test Filter 3 (403).

Referring now to FIG. 5, a sample image 410 is used for all the filters. The sample image can be chosen to be representative of the types of scenes in a video sequence. While a sample image 410 is indicated, it is understood that it is its data representation that will be transformed by all the filters.

Box 430 represents the reference image 430, arising when the sample image 410 is filtered by the ideal filter 320 according to box 130. Box 411 represents a Test Image 1, which arises when the sample image 410 is filtered by Test Filter 1 (401). Box 412 represents a Test Image 2, which arises when the sample image 410 is filtered by Test Filter 2 (402). Box 413 represents a Test Image 3, which arises when the sample image 410 is filtered by Test Filter 3 (403).

Box 521 includes the metrics of predicted visual differences when Test Image 1 (411) is compared to reference image 430, according to box 220. Similarly, box 522 includes the metrics of predicted visual differences when Test Image 2 (412) is compared to reference image 430. And box 523 includes the metrics of predicted visual differences when Test Image 3 (413) is compared to reference image 430.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. Apparatus according to the present invention thus includes purpose-built VLSI circuits, general-purpose digital signal processing chips, and general-purpose computers.

The algorithms presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below.

It should be clear to a person skilled in the art that the program of the invention need not reside in a single memory, or even a single machine. Various portions, modules or features of it can reside in separate memories, or even separate machines. The separate machines may be connected directly, or through a network, such as a local access network (LAN), or a global network, such as what is presently known as Internet-1. Similarly, the users need not be collocated with each other; but each only with a machine that houses a portion of the program.

The invention includes a computer-readable medium containing a program for designing a filter for scaling an image according to a predetermined ratio. The program comprises an input of the predetermined ratio, and softwares.

The program moreover includes software for designing a template Finite Impulse Response (FIR) filter for scaling an image according to the predetermined ratio having template coefficients that are real numbers.

The program also includes software for designing an ideal filter from the FIR template filter.

The program additionally includes software for filtering a sample image with the ideal filter to derive a reference image.

The program further includes software for determining a scalable skeleton filter having integer coefficients derivable from the template coefficients and conforming to an integer normalization requirement within a first preset tolerance. Preferably it is the integer normalization requirement described above.

The program moreover includes software for selecting a coefficient domain having a finite plurality of integer values for varying at least one of the integer coefficients of the skeleton filter to derive a finite universe of available integer coefficient sets around the skeleton integer filter. Preferably the software for selecting a coefficient domain centers the coefficient domain around the integer coefficient. Additionally, it selects a coefficient domain for each of the integer coefficients respectively, and centers each coefficient domain around its respective integer coefficient. Preferably it selects a coefficient domain that includes a similar number of integer numbers for each coefficient.

The program also includes software for selecting all integer coefficient sets available in the universe, thereby deriving a plurality of available corresponding test filters. It need not select them outright—instead it can run repeated loops having their values as ends.

The program additionally includes software for analyzing the available test filters according to the preset filter performance parameters to assign grades of performance in each parameter. Each test filter is understood as its identifier, plus the values of its coefficients.

The program also includes software for computing a figure of merit for each of the available test filters as a function of a combination of their grades.

The program moreover includes software for approving only the test filters having a figure of merit within a preset top percentile. Approving, in this document, is meant as another way of saying screening.

The program also includes software for filtering the sample image with each of the approved test filters to yield respective test images.

The program additionally includes software for comparing each of the test images with the reference image to determine respective sets of metrics for predicted visually perceptible differences from the reference image.

The program also includes software for ranking the test filters according to how well their respective sets of metrics meet preset visual difference evaluation criteria.

The program moreover includes software for choosing the top ranked test filter.

The program also includes outputting software for outputting the chosen filter.

A person skilled in the art will be able to practice the present invention in view of the present description, where numerous details have been set forth in order to provide a more thorough understanding of the invention. In other instances, well-known features have not been described in detail in order not to obscure unnecessarily the invention. In interpreting this document, words should be accorded a meaning consistent with what is found in common non-technical dictionaries, and also in technical dictionaries for the art of the invention. In addition, the meanings of the words in this document can be augmented from their particular usage in this document, especially where this document expressly gives them a specific meaning.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A method for designing a filter for scaling an image according to a predetermined ratio, comprising:

designing a template Finite Impulse Response (FIR) filter for scaling an image according to the predetermined ratio having template coefficients that are real numbers;

designing an ideal filter from the FIR template filter;

filtering a sample image with the ideal filter to derive a reference image;

determining a scalable skeleton filter having integer coefficients derivable from the template coefficients and conforming to an integer normalization requirement within a first preset tolerance;

selecting a coefficient domain having a finite plurality of integer values for varying at least one of the integer coefficients of the skeleton filter to derive a finite universe of available integer coefficient sets around the skeleton integer filter;

selecting all integer coefficient sets available in the universe, thereby deriving a plurality of available corresponding test filters;

approving only the available test filters that perform well in terms of preset filter performance parameters;

filtering the sample image with each of the approved test filters to yield respective test images;

comparing each of the test images with the reference image to determine respective sets of metrics for predicted visually perceptible differences from the reference image;

ranking the test filters according to how well their respective sets of metrics meet preset visual difference evaluation criteria; and choosing the top ranked test filter.

2. The method of claim 1, wherein the coefficient domain is selected to be centered around the integer coefficient.

3. The method of claim 1, wherein a coefficient domain is selected for each of the integer coefficients respectively.

4. The method of claim 3, wherein each coefficient domain is selected to be centered around its respective integer coefficient.

5. The method of claim 3, wherein all the coefficient domains are selected to include a similar number of integer numbers.

6. The method of claim 5, wherein each coefficient domain is selected to be centered around its respective integer coefficient.

7. The method of claim 1, wherein filtering the sample image with the approved test filters rescales an image dimension.

8. The method of claim 7, wherein the coefficient domain is selected to be centered around the integer coefficient.

9. The method of claim 7, wherein a coefficient domain is selected for each of the integer coefficients respectively.

10. The method of claim 9, wherein each coefficient domain is selected to be centered around its respective integer coefficient.

11. The method of claim 1, wherein determining the skeleton filter comprises selecting a value of a scalar a such that:

$$|ar_j - c'_j| \leq 0.5$$

and also, within a first preset tolerance:

$$\sum_{j=0}^{K} c'_{j-(K/2)} \approx N*2^R$$

wherein $r_j$ are the real number coefficients of the template filter, $c'_j$ are integer coefficients of the skeleton filter, K is the number of taps of the filter, R is any integer number and N is the denominator of the predetermined scaling ratio.

12. The method of claim 1, further comprising:

inquiring whether an available set of integer coefficients corresponding to a test filter meets the integer normalization requirement within a second preset tolerance; and if it does not, removing it from the available sets in the universe prior to filtering the sample image with an associated test filter.

13. The method of claim 1, wherein approving comprises:

analyzing the available test filters according to the preset filter performance parameters to assign grades of performance in each parameter;

computing a figure of merit for each of the available test filters as a function of a combination of their grades; and approving only the test filters having a figure of merit within a preset top percentile.

14. A computer-readable medium containing a program for designing a filter for scaling an image according to a predetermined ratio, the program comprising:

an input of the predetermined ratio;

software for designing a template Finite Impulse Response (FIR) filter for scaling an image according to the predetermined ratio having template coefficients that are real numbers;

software for designing an ideal filter from the FIR template filter;

software for filtering a sample image with the ideal filter to derive a reference image;

software for determining a scalable skeleton filter having integer coefficients derivable from the template coefficients and conforming to an integer normalization requirement within a first preset tolerance;

software for selecting a coefficient domain having a finite plurality of integer values for varying at least one of the integer coefficients of the skeleton filter to derive a finite universe of available integer coefficient sets around the skeleton integer filter;

software for selecting all integer coefficient sets available in the universe, thereby deriving a plurality of available corresponding test filters;

software for analyzing the available test filters according to the preset filter performance parameters to assign grades of performance in each parameter;

software for computing a figure of merit for each of the available test filters as a function of a combination of their grades;

software for approving only the test filters having a figure of merit within a preset top percentile;

software for filtering the sample image with each of the approved test filters to yield respective test images;

software for comparing each of the test images with the reference image to determine respective sets of metrics for predicted visually perceptible differences from the reference image;

software for ranking the test filters according to how well their respective sets of metrics meet preset visual difference evaluation criteria;

software for choosing the top ranked test filter; and outputting software for outputting the chosen filter.

15. The program of claim 14, wherein the software for selecting a coefficient domain centers the coefficient domain around the integer coefficient.

16. The program of claim 14, wherein the software for selecting a coefficient domain selects a coefficient domain for each of the integer coefficients respectively.

17. The program of claim 16, wherein the software for selecting a coefficient domain centers each coefficient domain around its respective integer coefficient.

18. The program of claim 16, wherein the software for selecting a coefficient domain selects a coefficient domain that includes a similar number of integer numbers for each coefficient.

19. The program of claim 18, wherein the software for selecting a coefficient domain centers each coefficient domain around its respective integer coefficient.

* * * * *

UNITED STATES PATENT AND TRADEMARK OFFICE
CERTIFICATE OF CORRECTION

PATENT NO. : 6,754,397 B1  Page 1 of 1
DATED : June 22, 2004
INVENTOR(S) : Westerman It is certified that error appears in the above-identified patent and that said Letters Patent is hereby corrected as shown below:

<u>Title page,</u>
Item [56], References Cited, OTHER PUBLICATIONS, "Title: H.263" should read -- Document No. MPEG95/0322, Title: H.263 --.

<u>Column 3,</u>
Line 35, "scalar a that" should read -- scalar α that --.

<u>Column 9,</u>
Line 66, "scalar a that" should read -- scalar α that --.

Signed and Sealed this

Tenth Day of May, 2005

JON W. DUDAS
*Director of the United States Patent and Trademark Office*